(12) United States Patent
Morgan, Jr.

(10) Patent No.: US 12,161,101 B2
(45) Date of Patent: Dec. 10, 2024

(54) LIGHTED FISHING POLE TIP APPARATUS

(71) Applicant: Daniel Lee Morgan, Jr., Des Moines, IA (US)

(72) Inventor: Daniel Lee Morgan, Jr., Des Moines, IA (US)

(*) Notice: Subject to any disclaimer, the term of this patent is extended or adjusted under 35 U.S.C. 154(b) by 0 days.

(21) Appl. No.: 18/176,477

(22) Filed: Feb. 28, 2023

(65) Prior Publication Data

US 2024/0284889 A1 Aug. 29, 2024

(51) Int. Cl.
| | | |
|---|---|---|
| A01K 97/00 | (2006.01) | |
| A01K 87/00 | (2006.01) | |
| A01K 87/04 | (2006.01) | |
| F21V 33/00 | (2006.01) | |

(52) U.S. Cl.
CPC ............ *A01K 97/00* (2013.01); *A01K 87/007* (2013.01); *A01K 87/04* (2013.01); *F21V 33/00* (2013.01)

(58) Field of Classification Search
CPC ...... A01K 87/007; A01K 87/04; A01K 97/00; F21V 33/00; F21V 33/008
See application file for complete search history.

(56) References Cited

U.S. PATENT DOCUMENTS

| | | | | |
|---|---|---|---|---|
| 4,697,375 A | * | 10/1987 | Mills ...................... | A01K 87/04 43/17.5 |
| 5,179,797 A | * | 1/1993 | Edwards ............... | A01K 97/125 43/25 |
| 5,357,410 A | * | 10/1994 | Cota ..................... | F21V 33/008 362/802 |
| 5,586,403 A | * | 12/1996 | Ward ................... | A01K 87/007 43/18.1 R |
| 5,855,084 A | * | 1/1999 | Huddleston ............ | A01K 87/04 43/17 |
| 6,061,946 A | * | 5/2000 | Toelken ............... | A01K 87/007 43/18.1 R |
| 10,986,824 B1 | * | 4/2021 | Walters ................ | A01K 87/007 |

FOREIGN PATENT DOCUMENTS

WO WO-2015157583 A1 * 10/2015 ........... A01K 87/007

* cited by examiner

*Primary Examiner* — Steven O Douglas
(74) *Attorney, Agent, or Firm* — Goodhue, Coleman & Owens, P.C.

(57) ABSTRACT

This invention improves the position of the Lighted tip moving it away from the pole and with testing and research improves the visibility because of its sleek ergonomic shape, it is also made of a super lightweight resin or plastic material to protect the Light itself and is easily manufactured around the last eyelet.

20 Claims, 2 Drawing Sheets

LIGHTED FISHING POLE TIP APPARATUS

PRIOR ART

All prior art falls into two categories, category number one are fiber optics or clearly see through pole in which the fiber optics or internal pole emits the light via a light source. U.S. Pat. No. 10,986,824 B1 Walters, U.S. Pat. No. 5,566,493 Minorics, US 2011/0162253 A1 Cobb, U.S. Pat. No. 5,738,433 Sparks, U.S. Pat. No. 5,172,508 Schmidt, U.S. Pat. No. 4,369,486 Pool, U.S. Pat. No. 4,775,920 Siebert, Zinders, U.S. Pat. No. 6,000,808 Hansen, U.S. Pat. No. 7,614,177 B1 Wheeler and US 2007/0283612 A1 Shaw, Kris, Gou fall into this category. These can make it difficult to manufacture for what they desire, and results are not the same as the current invention.

Category number two is the type that uses a light source external of the fishing pole to accomplish the desired results for night viewing. U.S. Pat. No. 8,104,219 B1 Pace, U.S. Pat. No. D871,542 Barrett, U.S. Pat. No. 7,337,577 B1 Ramirez, U.S. Pat. No. 5,357,410 Cota and Cota, U.S. Pat. No. 5,586,403 Ward, U.S. Pat. No. 6,061,946 Toelken, U.S. Pat. No. 5,855,084 Huddleston, Lenhart, U.S. Pat. No. 5,179,797 Edwards, Lohr, U.S. Pat. No. 4,697,375 Mills, and US 2016/0007582 A1, WO-2015157583-A1 Brancaleoni fall into this category.

U.S. Pat. No. 5,586,403 Ward uses an LED mounted toward the tip on the backside of the fishing pole, it does point to the Handle but is very close to the pole and this design leaves the LED assembly exposed and unprotected, leaving possibilities of being damaged. U.S. Pat. No. 10,986,824 B1 Walters is a design that requires a custom manufactured pole, also another version custom manufactured to replace a section of the pole. This light is at the tip and again requires a custom see through pole. U.S. Pat. No. 6,061,946 Toelken is like U.S. Pat. No. 10,986,824 B1 Walters except for the LED being closer to the end. U.S. Pat. No. 5,855,084 Hudleston has an illuminating device made to fit into a custom-made last eyelet, in one version this does point back to the handle but again very close to the pole. U.S. Pat. No. 5,179,797 Edwards uses a powered LED that is attached to the underside of the pole, and it points forward, it also has everything attached externally and again is susceptible to be damaged. U.S. Pat. No. 4,697,375 Mills has a few different designs one has an exposed battery compartment near the end of the pole, another has a specially designed annular LED member for the last eyelet, one has an LED on the top side near the tip and the final one with a specially made last eyelet with a thin clear material webbed around it. US 2016/0007582, WO-2015157583-A1 Brancaleoni is a design with several LEDs on the bottom side toward the end of the pole pointing down, these are all going to hard to manufacture on such a small diameter end of the pole, these will also be exposed.

BACKGROUND OF THE INVENTION

The background of this invention is around low-level light or night fishing and involves a fishing pole equipped with some sort of light built in or around a fishing pole to help in the aid of visually identifying the movement of the fishing pole when a fish strikes the bait and allowing the fisherman to react and catch the fish.

SUMMARY OF THE INVENTION

This Lighted fishing pole tip apparatus is for the purpose of giving the fisherman the best possible view of the last eyelet in which is the most noticeable movement available when a fish is biting, and because of its angle it is very efficient at doing this whether the fishing pole is up right or upside down, there is no other apparatus like this. Due to its construction and position on the fishing pole it can be included in the manufacturing process or retrofitted on existing poles with some modifications, and it allows for the normal use of the last eyelet. The lighted fishing pole tip apparatus is supplied electricity by batteries in the handle through a switch and wires inside the pole.

DETAILED DESCRIPTION OF THE INVENTION

Figure 1:
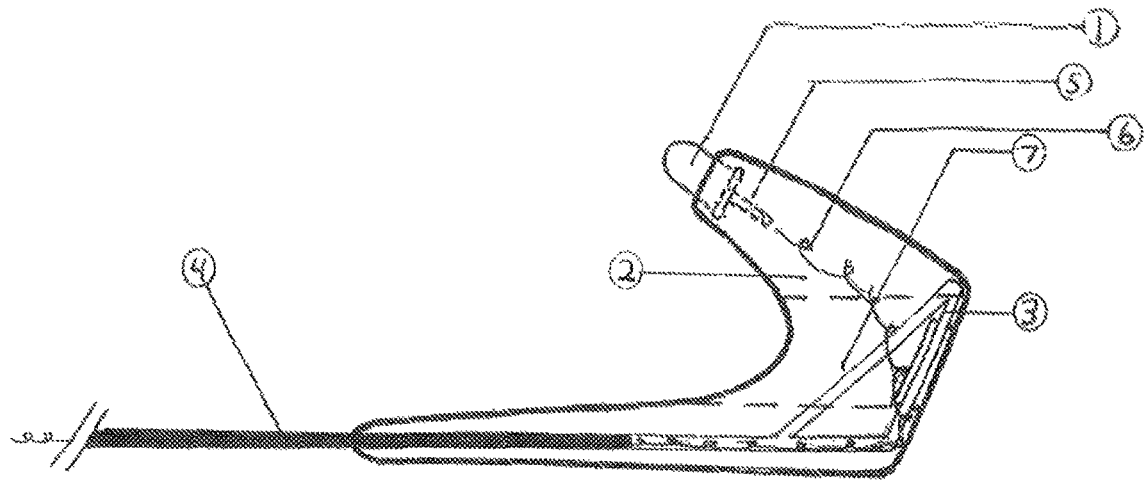
FIG. 1 is a side perspective view of the lighted fishing pole housing assembly disposed on the last eyelet of a fishing pole.
Figure 2:
FIG. 2 is a top perspective view of the lighted fishing pole housing assembly disposed on the last eyelet of a fishing pole.
Figures 3A, 3B:
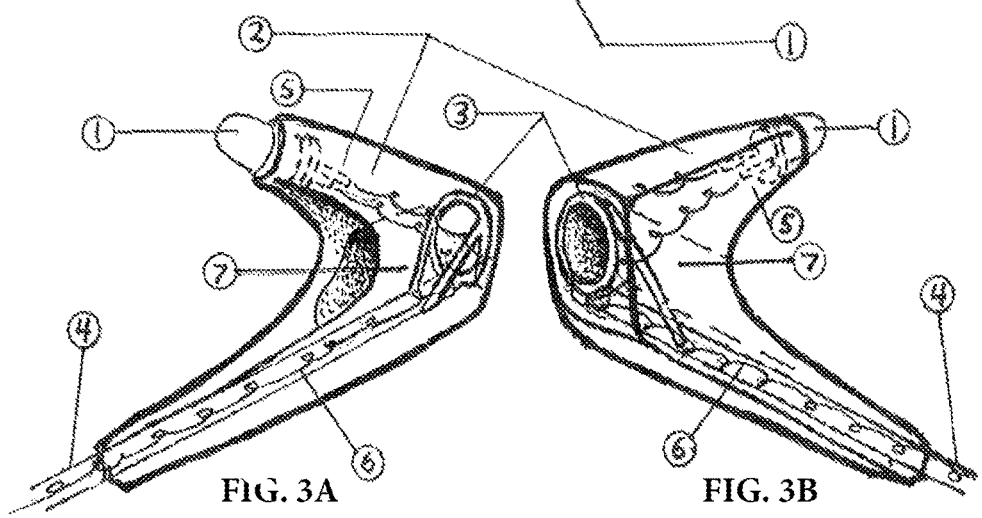
FIG. 3A is a top side perspective view of the lighted fishing pole housing assembly disposed on the last eyelet of a fishing pole.
FIG. 3B is a top side perspective view showing the opposite side of the lighted fishing pole housing shown in FIG. 3A.
Figure 4:
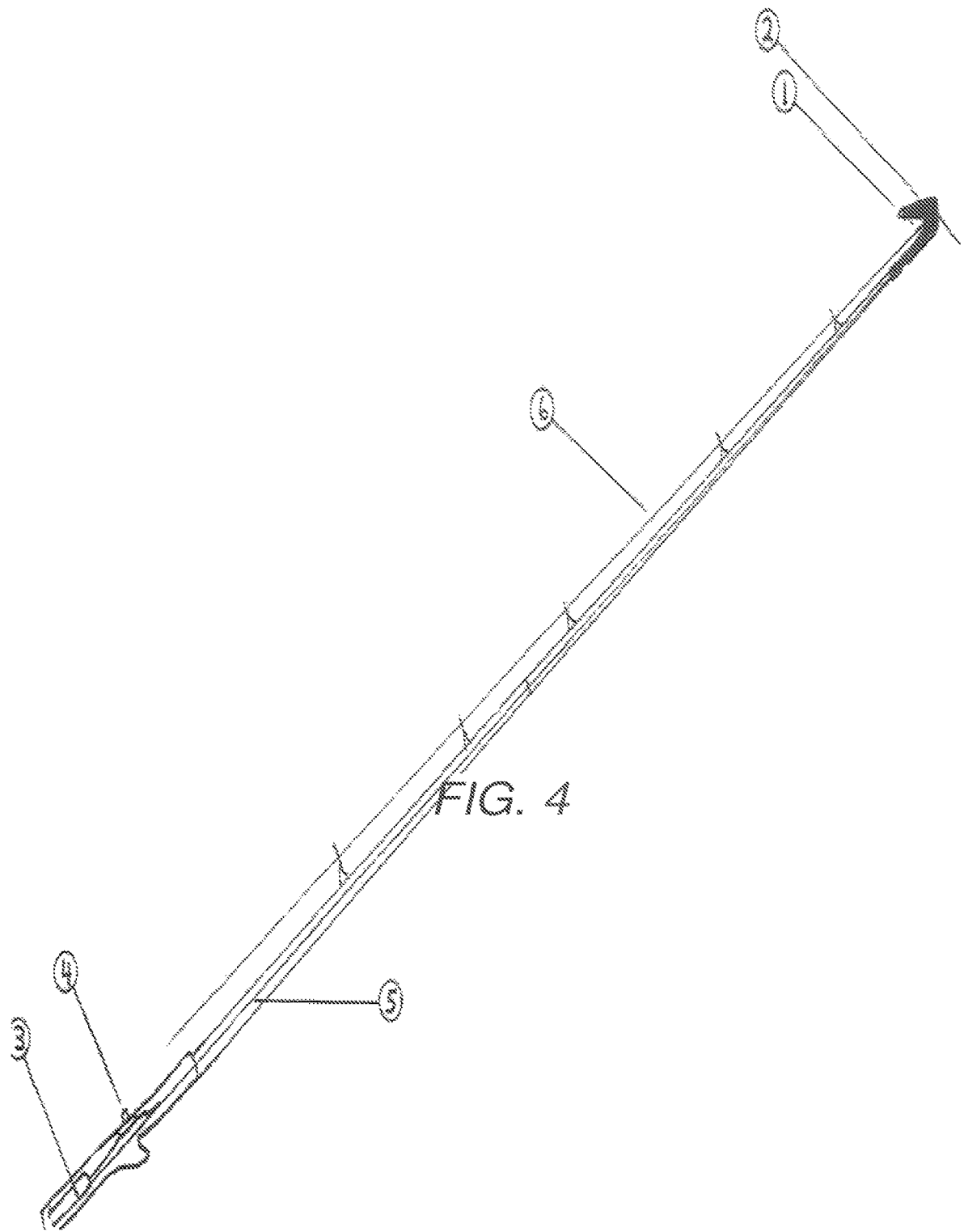

FIG. 1 shows the side view of the invention, FIG. 2 shows the top view and FIG. 3 shows front and rear angle views. 1 is the LED molded inside a housing comprising of a strong super lightweight Resin or plastic 2 shows the housing made of this strong super lightweight resin or plastic molded around the last eyelet 3 is the last eyelet of the fishing pole 4 is the rod of the fishing pole 5 shows the electrical leads of the LED for connecting the power 6 is the wiring through which the power is supplied to the LED it passes through the center of the fishing pole 7 shows an opening through the housing allowing the string to pass through the last eyelet. FIG. 4 shows the basic configuration needed to supply power to the lighted fishing pole apparatus/housing. 1 shows the Light/LED positioned in the housing at an angle approximately a 45-degree angle to the fishing pole handle 2 shows the housing 3 shows the power source (batteries) location 4 shows the on/off switch location to control power to the Light/LED 5 shows a path for the wires used to supply the power to the Light/LED.

The invention claimed is:
1. A fishing pole, comprising:
a handle;
a pole having first and second opposing terminal ends, wherein the handle is attached at the first terminal end of the pole;
a plurality of eyelets disposed on the pole and spaced between the first and second opposing terminal ends, wherein a last one of the plurality of eyelets is disposed at the second terminal end of the pole;
a housing disposed at the second terminal end of the pole;
a light carried by the housing for emitting light from the second terminal end of the pole;
an opening in the housing concentrically aligned with the last one of the plurality of eyelets and configured for passing fishing line therethrough, wherein the opening is disposed between the second terminal end of the pole and the light.

2. The fishing pole of claim 1, wherein the last one of the plurality of eyelets is contained within the housing.

3. The fishing pole of claim 1, further comprising:
a power source disposed within the handle and a switch electrically connected between the power source and the light in the housing.

4. The fishing pole of claim 1, further comprising:
an on/off switch disposed in the handle and a wire connected between the switch and the light in the housing and configured for controlling operation of the light.

5. The fishing pole of claim 1, further comprising:
a wire contained with the housing and connected to the light, wherein the wire is configured for delivering electricity to the light.

6. The fishing pole of claim 1, wherein the housing includes a first portion containing the second terminal end of the pole, a middle portion containing the last one of the plurality of eyelets, and a second portion carrying the light.

7. The fishing pole of claim 1, wherein the light is angled 45 degrees relative to the second terminal end of the pole.

8. A fishing pole, comprising:
a handle;
a pole having first and second opposing terminal ends, wherein the handle is attached at the first terminal end of the pole;
a plurality of eyelets disposed on the pole and spaced between the first and second opposing terminal ends, wherein a last one of the plurality of eyelets is disposed at the second terminal end of the pole;
a housing disposed at the second terminal end of the pole, the housing comprising:
a first portion containing the second terminal end of the pole;
a middle portion containing the last one of the plurality of eyelets; and
a second portion carrying a light.

9. The fishing pole of claim 8, wherein the housing further comprises an opening concentrically aligned with the last one of the plurality of eyelets and configured for passing fishing line therethrough.

10. The fishing pole of claim 8, wherein the second portion of the housing is angled away from first portion of the housing by the middle portion of the housing.

11. The fishing pole of claim 8, wherein the light is angled away from the pole by the housing for emitting light from the second terminal end of the pole back toward a user for identifying movement of the second terminal end of the pole.

12. The fishing pile of claim 8, further comprising:
an opening disposed in the housing and concentrically aligned with the last one of the plurality of eyelets on the second terminal end of the pole and configured for receiving fishing line therethrough.

13. The fishing pole of claim 8, wherein the light in the second portion of the housing is angled 45 degrees relative to the terminal end of the pole in the first portion of the housing.

14. The fishing pole of claim 8, further comprising:
a wire passing through the first, middle and second portions of the housing, wherein the wire is connected to the light in the second portion of the housing and configured for powering the light.

15. The fishing pole of claim 8, further comprising:
an opening in the middle portion of the housing and concentrically disposed with the last one of the plurality of eyelets, wherein the opening is disposed between the light carried by the second portion of the housing and the second terminal end of the pole contained within the first portion of the housing.

16. A fishing pole, comprising:
a handle;
a pole having first and second opposing terminal ends, wherein the handle is attached at the first terminal end of the pole;
a plurality of eyelets disposed on the pole and spaced between the first and second opposing terminal ends, wherein a last one of the plurality of eyelets is disposed at the second terminal end of the pole;
a housing disposed at the second terminal end of the pole, the housing comprising:
a first portion containing the last one of the plurality of eyelets;
a second portion containing a light position; and
a middle portion connecting the first and second portions;
a light carried by the light position in the second portion of the housing for emitting light toward the user from the second terminal end of the pole;
an opening passing through the middle portion of the housing and the last one of the plurality of eyelets and configured for passing fishing line therethrough.

17. The fishing pole of claim 16, wherein the light is angled 45 degrees relative to the second terminal end of the pole.

18. The fishing pole of claim 16, wherein the second portion of the housing containing the light position is angled 45 degrees relative to the second terminal end of the pole contained in the first portion of the housing.

19. The fishing pole of claim 16, wherein the light is angled relative to the last one of the plurality of eyelets back towards a user for identifying movement of the second terminal end of the pole during use.

20. The fishing pole of claim 16, further comprising:
a wire passing through the first, middle and second portions of the housing, wherein the wire is connected to the light in the second portion of the housing and configured for powering the light.

* * * * *